(12) United States Patent
Casazza et al.

(10) Patent No.: US 9,929,611 B2
(45) Date of Patent: Mar. 27, 2018

(54) WIND TURBINE ROTARY ELECTRIC MACHINE ROTOR, AND WIND TURBINE COMPRISING SUCH A ROTOR

(71) Applicant: WINDFIN B.V., Leimuiden (NL)

(72) Inventors: Matteo Casazza, Val Di Vizze (IT); Georg Folie, Wiesen (IT); Maddalena Renier, Salorno (IT); Daniele Franco, Luxembourg (LU)

(73) Assignee: WINDFIN B.V., Leimuiden (NL)

( * ) Notice: Subject to any disclaimer, the term of this patent is extended or adjusted under 35 U.S.C. 154(b) by 507 days.

(21) Appl. No.: 14/416,570

(22) PCT Filed: Jul. 25, 2013

(86) PCT No.: PCT/IB2013/056120
§ 371 (c)(1),
(2) Date: Jan. 22, 2015

(87) PCT Pub. No.: WO2014/016805
PCT Pub. Date: Jan. 30, 2014

(65) Prior Publication Data
US 2015/0180295 A1    Jun. 25, 2015

(30) Foreign Application Priority Data
Jul. 25, 2012 (IT) .............................. MI2012A1304

(51) Int. Cl.
*H02K 9/00*    (2006.01)
*H02K 1/32*    (2006.01)
(Continued)

(52) U.S. Cl.
CPC ................ *H02K 1/32* (2013.01); *F03D 9/25* (2016.05); *H02K 1/2773* (2013.01);
(Continued)

(58) Field of Classification Search
CPC .................................. F03D 9/25; F03D 80/60
(Continued)

(56) References Cited

U.S. PATENT DOCUMENTS 6,676,122 B1    1/2004   Wobben
7,057,305 B2    6/2006   Kruger-Gotzmann et al.
(Continued)

FOREIGN PATENT DOCUMENTS

EP    1988282 A2    11/2008
EP    2136077 A2    12/2009
(Continued)

OTHER PUBLICATIONS

International Search Report and Written Opinion for International Application No. PCT/IB2013/056120 dated Feb. 6, 2014.

*Primary Examiner* — Thanh Lam
(74) *Attorney, Agent, or Firm* — Neal, Gerber & Eisenberg LLP

(57) ABSTRACT

A rotor of a wind turbine rotary electric machine has a tubular structure extending and configured to rotate about an axis of rotation; a plurality of active segments parallel to and arranged about the axis of rotation and fitted to the tubular structure; and a plurality of cooling channels formed in the tubular structure.

18 Claims, 7 Drawing Sheets

(51) Int. Cl.
  *F03D 9/25* (2016.01)
  *H02K 1/27* (2006.01)
  *H02K 7/18* (2006.01)

(52) U.S. Cl.
  CPC ....... *H02K 7/1838* (2013.01); *H02K 2213/12* (2013.01); *Y02E 10/725* (2013.01)

(58) Field of Classification Search
  USPC ............................ 310/52–59, 61; 290/44, 55
  See application file for complete search history.

(56) References Cited

U.S. PATENT DOCUMENTS

| | | |
|---|---|---|
| 7,161,260 B2 | 1/2007 | Kruger-Gotzmann et al. |
| 7,168,251 B1 | 1/2007 | Janssen |
| 7,594,800 B2 | 9/2009 | Teipen |
| 2007/0103027 A1 | 5/2007 | Jansen et al. |
| 2008/0296903 A1 | 12/2008 | Todorof |
| 2010/0277028 A1 | 11/2010 | Alexander et al. |
| 2012/0074709 A1* | 3/2012 | Cole ........................ H02K 1/32 290/55 |
| 2012/0133230 A1 | 5/2012 | Jansen |
| 2012/0248780 A1* | 10/2012 | Casazza ............... H02K 1/2773 290/55 |

FOREIGN PATENT DOCUMENTS

| | | |
|---|---|---|
| EP | 2320080 A1 | 5/2011 |
| EP | 2354542 A1 | 8/2011 |
| EP | 2403108 A1 | 1/2012 |

\* cited by examiner

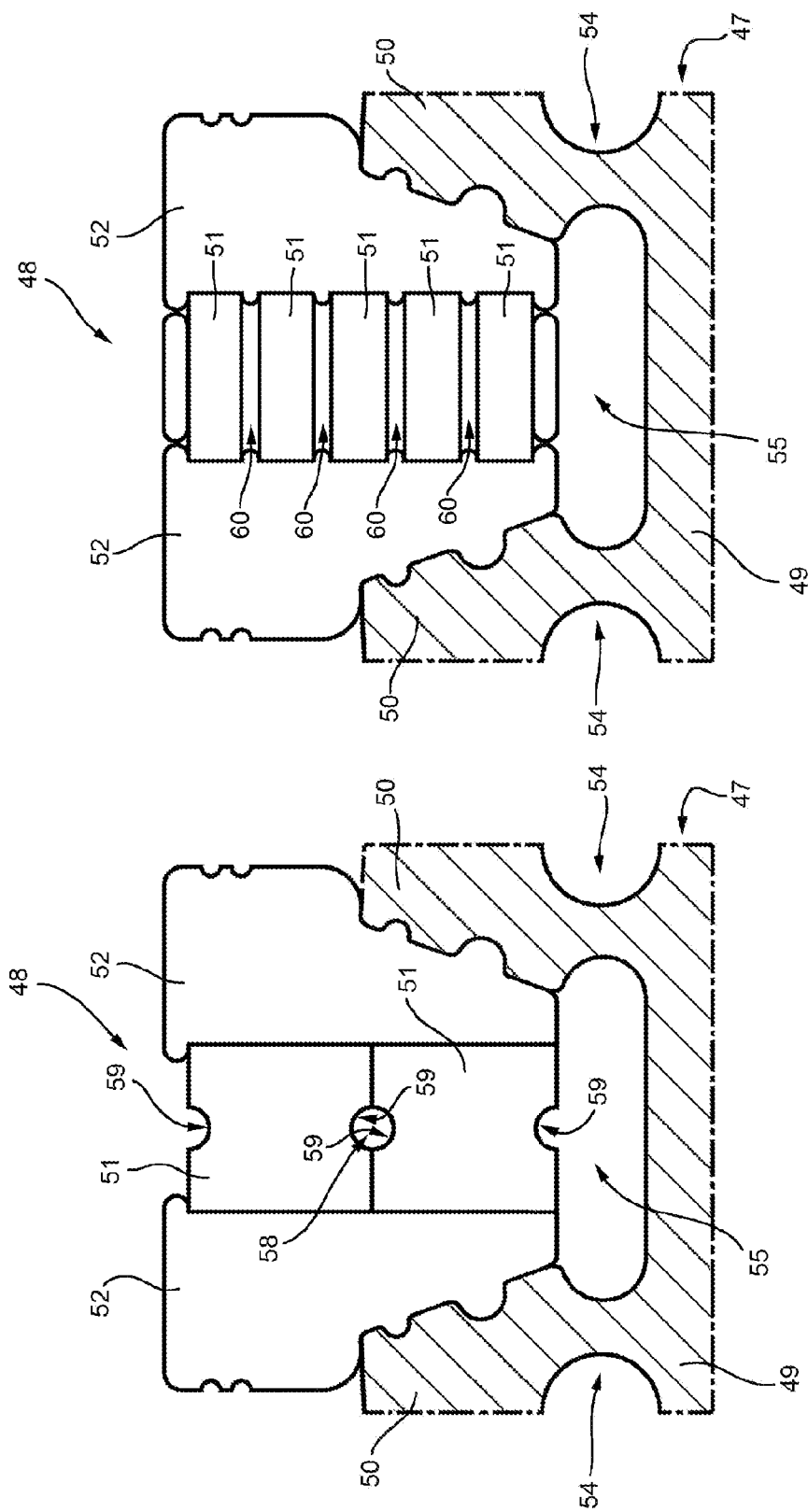

WIND TURBINE ROTARY ELECTRIC MACHINE ROTOR, AND WIND TURBINE COMPRISING SUCH A ROTOR

PRIORITY CLAIM

This application is a national stage application of PCT/IB2013/056120, filed on Jul. 25, 2013, which claims the benefit of and priority to Italian Patent Application No. MI2012A 001304, filed on Jul. 25, 2012, the entire contents of which are each incorporated by reference herein.

BACKGROUND

To produce electric energy using certain known wind turbines, rotary electric machines are used to convert kinetic energy to electric energy. Part of the kinetic energy converted by the rotary electric machine is converted to heat, which must be removed to optimize efficiency of the machine. As the temperature increases, the efficiency of the rotary electric machine decreases.

The electric energy produced is subsequently transformed in phase and frequency in stationary electric machines, which are also cooled to optimize performance.

For this purpose, the wind turbines described in U.S. Pat. No. 7,057,305, U.S. Pat. No. 7,161,260, U.S. Pat. No. 6,676,122, U.S. Pat. No. 7,594,800 and EP Patent No. 2,136,077 comprise air cooling systems. More specifically, EP Patent No. 2,136,077 describes a wind turbine comprising a rotary electric machine; a rotary assembly with a hub; blades fitted to the hub; a nacelle supporting the rotary electric machine; and a forced-air cooling system, which feeds air successively through the hub, the rotary electric machine and the nacelle. In other words, air flows in through a first opening in the hub, and out through a second opening in the rear of the nacelle.

Air cooling systems provide for fairly good performance of rotary electric machines on wind turbines installed in relatively mild or cold climates.

In hot climates, on the other hand, liquid cooling systems are required.

U.S. Pat. No. 7,168,251 B1 describes a wind turbine comprising a closed-circuit, liquid cooling system.

Wind turbines must often be designed and built with a cooling system designed according to the climate of where the wind turbine is installed (i.e., to maximize power and efficiency of the electric machine according to the climate at the installation site).

Designing and building wind turbines according to the climate at the installation site, the scale economies made possible by mass production of the wind turbine component parts are greatly reduced.

In this respect, known cooling systems are not particularly versatile and perform relatively poorly as regards to cooling the electric generator.

To eliminate this drawback, Applicant's Patent Application No. EP 2,354,542 proposes a rotor liquid cooling system with a tubular structure fitted with heat exchangers.

This system is highly effective and versatile, but the heat exchangers increase the weight of the rotor.

SUMMARY

The present disclosure relates to a wind turbine rotary electric machine rotor.

It is an advantage of the present disclosure to provide a rotary electric machine rotor that can be effectively cooled by a liquid or gas or a liquid/gas mixture, and is configured to eliminate certain of the drawbacks of certain of the known art.

According to the present disclosure, there is provided a wind turbine rotary electric machine rotor, the rotor comprising a tubular structure extending and configured to rotate about an axis of rotation; a plurality of active segments parallel to and arranged about the axis of rotation and fitted to the tubular structure; and a plurality of cooling channels formed in the tubular structure. This provides for relatively highly effective cooling of the tubular structure, which is positioned directly contacting the active segments.

In certain embodiments of the present disclosure, each cooling channel is parallel to the axis of rotation, and extends the full axial length of the tubular structure.

In certain embodiments of the present disclosure, the tubular structure comprises a cylindrical body; the plurality of cooling channels including axial cooling channels formed in the cylindrical body. In other words, the cylindrical body, which, in certain embodiments, is made of metal, is traversed by cooling channels.

In certain embodiments, the cylindrical body comprises axial ribs configured to support the active segments; the cooling channels comprising cooling channels in the axial ribs. Because the axial ribs are positioned contacting the active segments, the cooling system of the present disclosure is configured to cool the axial ribs.

In another embodiment of the present disclosure, the tubular structure comprises a plurality of sectors arranged about the axis of rotation; the plurality of cooling channels comprising cooling channels extending inside the sectors.

It should be appreciated that in certain embodiments, instead of a one-piece cylindrical body, the tubular structure may comprise a plurality of adjacent sectors; in which case, the cooling channels can be formed relatively easily in each sector.

More specifically, each sector is extruded; the cooling channels being extruded directly inside the sector. The cooling channels can thus be formed simultaneously with the sector.

In various embodiments, each sector is defined by a stack of laminations with openings; each cooling channel being defined by openings aligned in a direction parallel to the axis of rotation. In this way, the sector is also highly capable of conducting magnetic flux, and the cooling channels are aligned with one another.

In certain embodiments of the present disclosure, each sector comprises pipes housed in the cooling channels. In certain of these embodiments, the pipes adhere to the sector along the walls of the cooling channels.

In certain embodiments of the present disclosure, each sector has axial ribs configured to support the active segments. Each sector is thus configured to directly support, and be positioned contacting, the active segments.

In certain embodiments of the present disclosure, in addition to cooling channels formed in the tubular structure, the rotor also comprises further cooling channels extending in an axial direction and, in certain embodiments, the whole length of the rotor.

In certain embodiments of the present disclosure, the further cooling channels are bounded by the tubular structure and the active segments.

It should be appreciated that in certain embodiments, since the active segments are fitted directly to the tubular structure, the tubular structure and/or the active segments need simply be configured to define the cooling channels once the active segments are fitted to the tubular structure.

Each further cooling cannel is, in certain embodiments, lined with a hydroformed pipe to secure the respective active segment to the tubular structure. The hydroformed pipe lining, on the one hand, enables liquid to be conducted inside the further cooling channel, and, on the other, provides for securing the active segment to the tubular structure.

In certain embodiments of the present disclosure, the further cooling channels extend axially and are located inside the active segments. It is thus possible to cool the heat-generating active segment.

In certain embodiments of the present disclosure, the rotor is associated with a liquid cooling system comprising at least one rotating circuit portion extending at least partly inside the cooling channels. In these embodiments, the possibility of liquid-cooling the rotor improves rotor cooling capacity, especially when the cooling channels are located inside the tubular structure.

It is a further advantage of the present disclosure to provide a wind turbine configured to eliminate certain of the drawbacks of certain of the known art.

According to the present disclosure, there is provided a wind turbine comprising a rotary electric machine, and a blade assembly connected to the rotary electric machine; and wherein the rotary electric machine comprises a rotor as described above.

In certain embodiments, the rotor is connected directly to the blade assembly to eliminate the need for a mechanical transmission.

In certain embodiments of the present disclosure, the wind turbine comprises a liquid cooling system, in turn comprising a rotating circuit portion fitted to the rotor, and a stationary circuit portion.

Additional features and advantages are described in, and will be apparent from the following Detailed Description and the figures.

BRIEF DESCRIPTION OF THE DRAWINGS

A number of non-limiting embodiments of the present disclosure will be described by way of example with reference to the attached drawings, in which:

FIGS. 8 and 9 show larger-scale, partly sectioned side views, with parts removed for clarity, of details of the FIG. 9 rotor in accordance with variations of the present disclosure.

DETAILED DESCRIPTION

Figure 1:
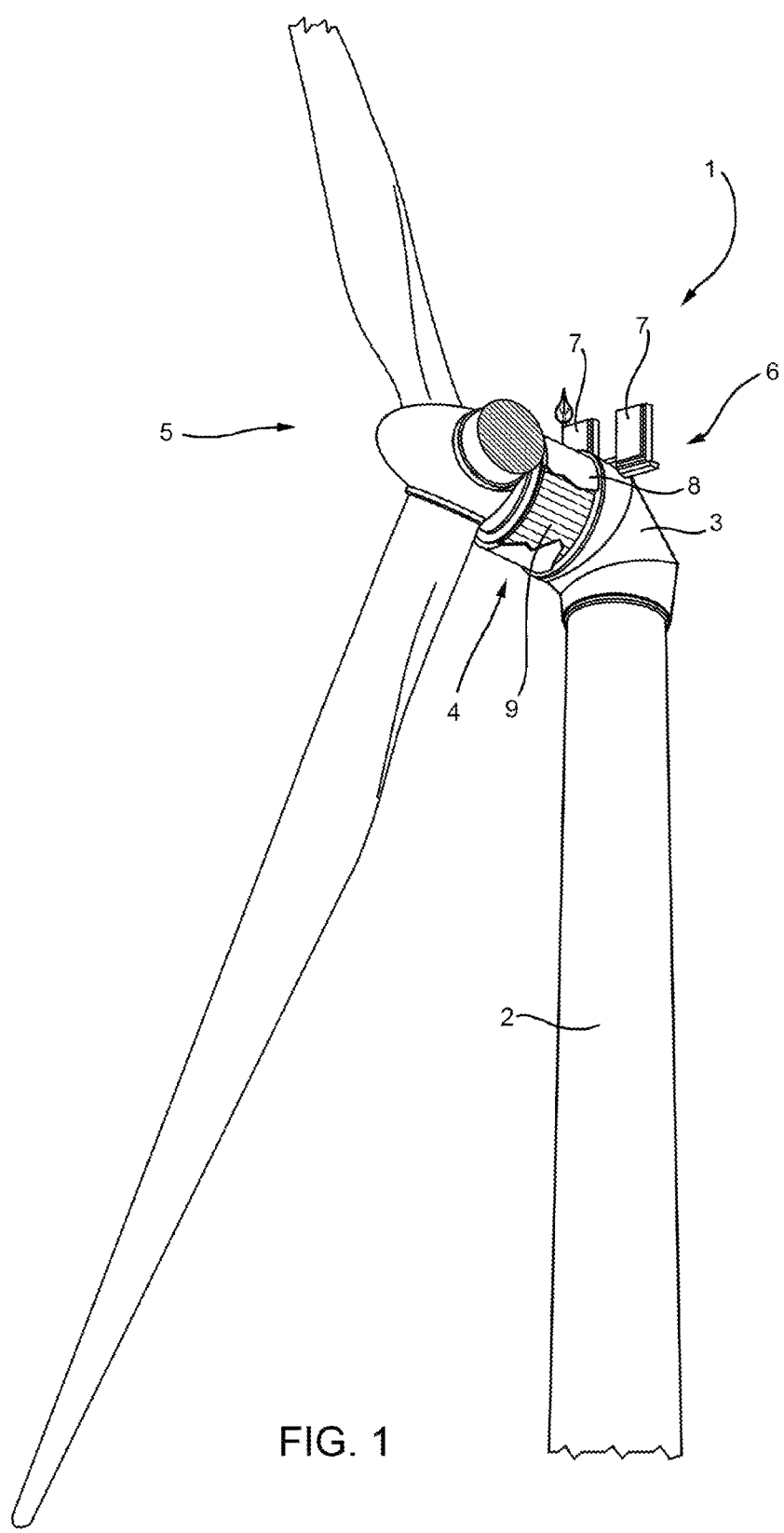
FIG. 1 shows a view in perspective, with parts removed for clarity, of a wind turbine equipped with a rotor in accordance with the present disclosure.

Referring now to the example embodiments of the present disclosure illustrated in FIGS. 1 to 9, number 1 in FIG. 1 indicates as a whole a wind turbine configured to produce electric energy. Wind turbine 1 comprises a pylon 2; a nacelle 3 mounted to rotate on pylon 2; an electric machine 4 fitted to nacelle 3; and a blade assembly 5 connected to electric machine 4.

The wind turbine also comprises a liquid cooling system 6, of which FIG. 1 only shows two heat exchangers 7 which, in the example shown, are fitted to the outside of nacelle 3.

In the example shown, electric machine 4 comprises a stator 8 fixed to nacelle 3; and a rotor 9, which is supported to rotate with respect to stator 8, is located inside stator 8, and is connected rigidly to, and driven directly by, blade assembly 5.

It is understood that the present disclosure also applies to configurations other than the one shown and described in detail (i.e., to configurations in which the rotor surrounds the stator, or in which a drive is interposed between the blade assembly and the rotor).

Figure 2:
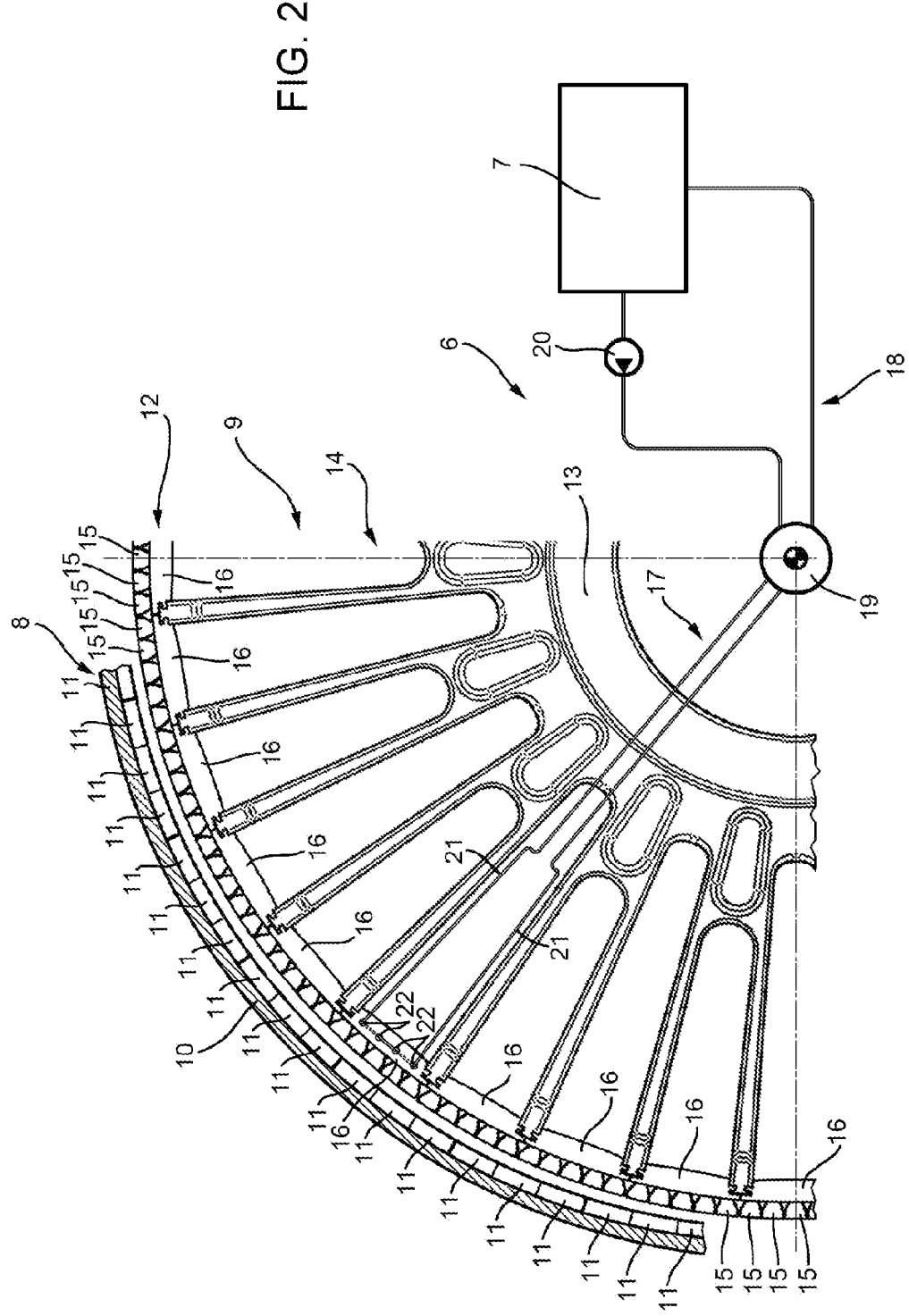
FIG. 2 shows a partly schematic elevation, with parts removed for clarity, of a rotary electric machine equipped with the FIG. 1 rotor, and of a liquid cooling system associated with the rotor.

With reference to FIG. 2, electric machine 4 is tubular and extends about an axis of rotation A.

In the example shown, stator 8 comprises a tubular structure 10; and active segments 11, which are arranged about axis of rotation A, are fitted to tubular structure 10, and extend axially. Rotor 9 comprises a tubular structure 12; a hub 13; a radial structure 14 configured to connect hub 13 to tubular structure 12; and active segments 15 arranged about axis of rotation A.

In the example shown, tubular structure 12 comprises a plurality of sectors 16 arranged about axis of rotation A and substantially adjacent to one another circumferentially. Each sector 16 is fitted to radial structure 14. Rotor 9 is connected to liquid cooling system 6, which comprises a rotary circuit portion 17 and a stationary circuit portion 18. Rotor 9 actually comprises rotary circuit portion 17 of liquid cooling system 6. Liquid cooling system 6 schematically comprises a rotary liquid distributor 19 to which rotary circuit portion 17 and stationary circuit portion 18 are connected; a liquid circulating pump 20 located along stationary circuit portion 18; and at least one of heat exchangers 7, which are also located along stationary circuit portion 18.

Liquid cooling system 6 generally comprises a plurality of rotary circuit portions 17, each associated with a respective sector 16. Each rotary circuit portion 17 comprises two, respectively liquid feed and liquid return, branches 21, which, in the example shown, extend radially at radial structure 14.

Tubular structure 12 comprises a plurality of cooling channels 22 formed in tubular structure 12 itself. In the example shown, each sector 16 has cooling channels 22 parallel to axis of rotation A. The cooling channels 22 formed in tubular structure 12 serve to conduct air, or, as in the example shown in the attached drawings, form an integral part of liquid cooling system 6. In other words, rotary circuit portion 17 is defined partly by cooling channels 22.

Figure 3:
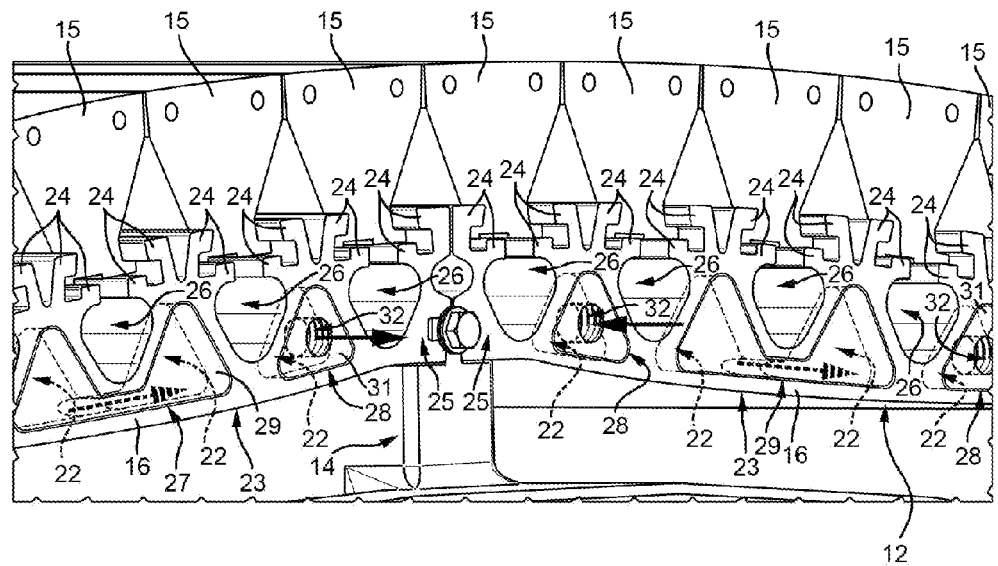
FIG. 3 shows a larger-scale view in perspective, with parts removed for clarity, of a detail of the FIG. 2 rotor.

More specifically, and with reference to FIG. 3, each sector 16 is defined by an extruded section cut to the required length, and comprises a main body 23; a plurality of cooling channels 22; ribs 24 configured to support active segments 15; and two axial guides 25 configured to form an axially-sliding joint with radial structure 14.

Figure 4:
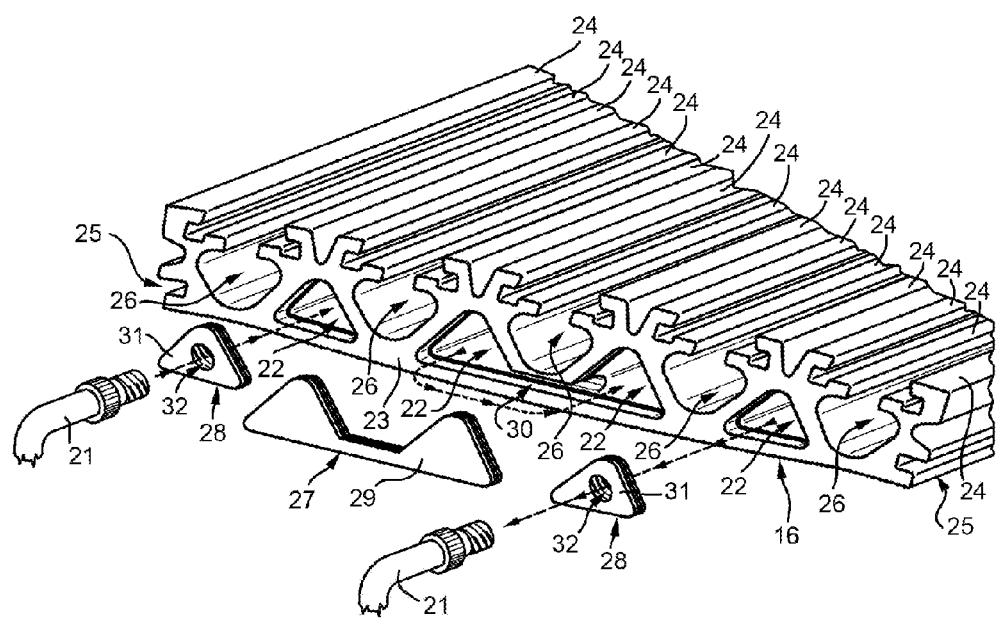
FIG. 4 shows a larger-scale, partly exploded view in perspective, with parts removed for clarity, of a component of the FIG. 2 rotor.

With reference to FIG. 4, each sector 16 comprises four cooling channels 22; and five axial grooves 26 alternating with cooling channels 22.

In the example shown, cooling channels 22 are configured to conduct cooling liquid, and axial grooves 26 to conduct cooling air.

The four cooling channels 22 are connected to one another by fittings 27, and two of the cooling channels 22 are connected to branches 21 by respective fittings 28.

Alternatively, each cooling channel is connected to an inlet manifold and an outlet manifold.

Each fitting 27 comprises a plug 29 configured to seal two adjacent cooling channels 22 and a cavity 30 formed in main body 23 and connecting the two adjacent cooling channels 22.

Each fitting 28 comprises a plug 31 configured to seal a cooling channel 22, and which has an attachment 32 configured to connect plug 31 to a branch 21.

Figure 5:
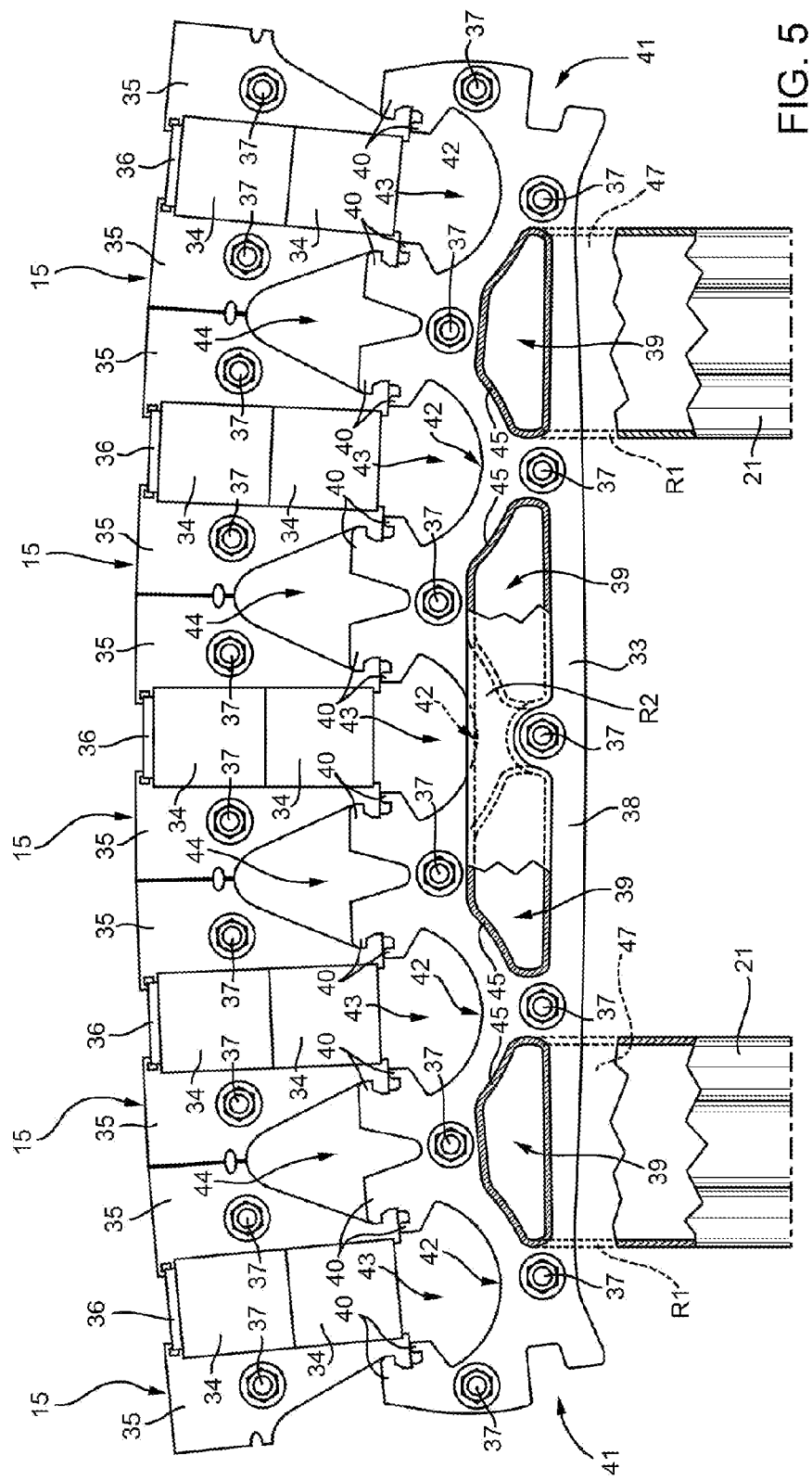
FIG. 5 shows a partly sectioned side view, with parts removed for clarity, of a variation of the FIG. 4 component.
Figure 6:
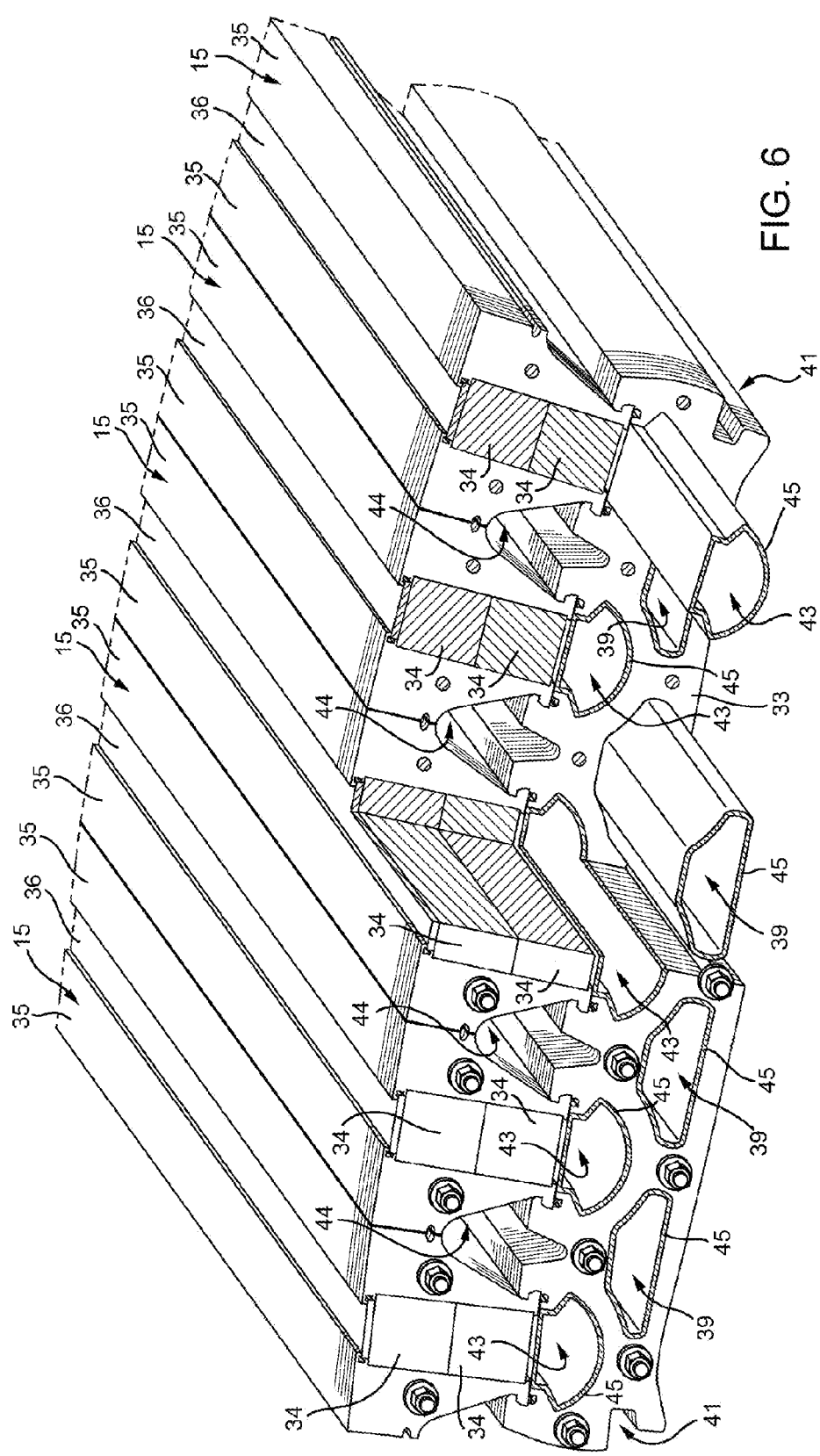
FIG. 6 shows a partly exploded view in perspective, with parts removed for clarity, of the FIG. 5 variation.

With reference to FIGS. 5 and 6, number 33 indicates a sector similar to sector 16 in FIGS. 3 and 4, and which is configured for assembly to radial structure 14, to define tubular structure 12 (FIG. 2), and to support active segments 15. Active segments 15 are shown in more detail in FIGS. 5 and 6, and, in the example shown, each comprise a group of permanent magnets 34, and two magnetic guides 35 on opposite sides of the group of permanent magnets 34. Each magnetic guide 35 is defined by a pack of laminations, is prismatic, and has a portion configured to form a prismatic joint with sector 33, and to define a seat for the group of permanent magnets 34 and for a protective plate 36. Magnetic guide 35 comprises ties 37 configured to tighten together the pack of laminations, and is generally impregnated with resin.

In the example shown in FIGS. 5 and 6, each sector 33 is also defined by a pack of laminations tightened together by ties 37, and comprises a main body 38; a plurality of cooling channels 39; ribs 40 configured to support active segments 15; and two axial guides 41 configured to form an axially-sliding joint with radial structure 14 (FIG. 2).

Each sector 33 comprises four cooling channels 39, and five axial grooves 42 alternating with cooling channels 39. Main body 38 of sector 33 and each active segment 15 form a cooling channel 43 at each groove 42. And likewise, main body 38 and each two adjacent active segments 15 define a further cooling channel 44.

In general, sector 33 and active segments 15 fitted to sector 33 together define cooling channels 39 formed in sector 33, and cooling channels 43 and 44 located between sector 33 and the active segments.

Cooling channels 39, 43 and 44 form part of air cooling circuits or liquid cooling circuits.

With reference to FIG. 5, the walls of cooling channels 39 may be lined with polymer material or with actual hydroformed pipes 45, which, when cooling channels 39 define rotating circuit portion 17, are connected to fittings R1 and R2: R2 configured to connect two cooling channels 39; and R1 for each connecting a cooling channel 39 to a branch 21 of rotating circuit portion 17.

Likewise, as shown in FIG. 6, the other cooling channels 43 and 44 may also theoretically be lined with hydroformed pipes 45 and form part of a liquid cooling circuit.

If so, lining cooling channels 43 with hydroformed pipes provides for securing active segment 15 to tubular structure 12, and in particular to sector 33.

Figure 7:
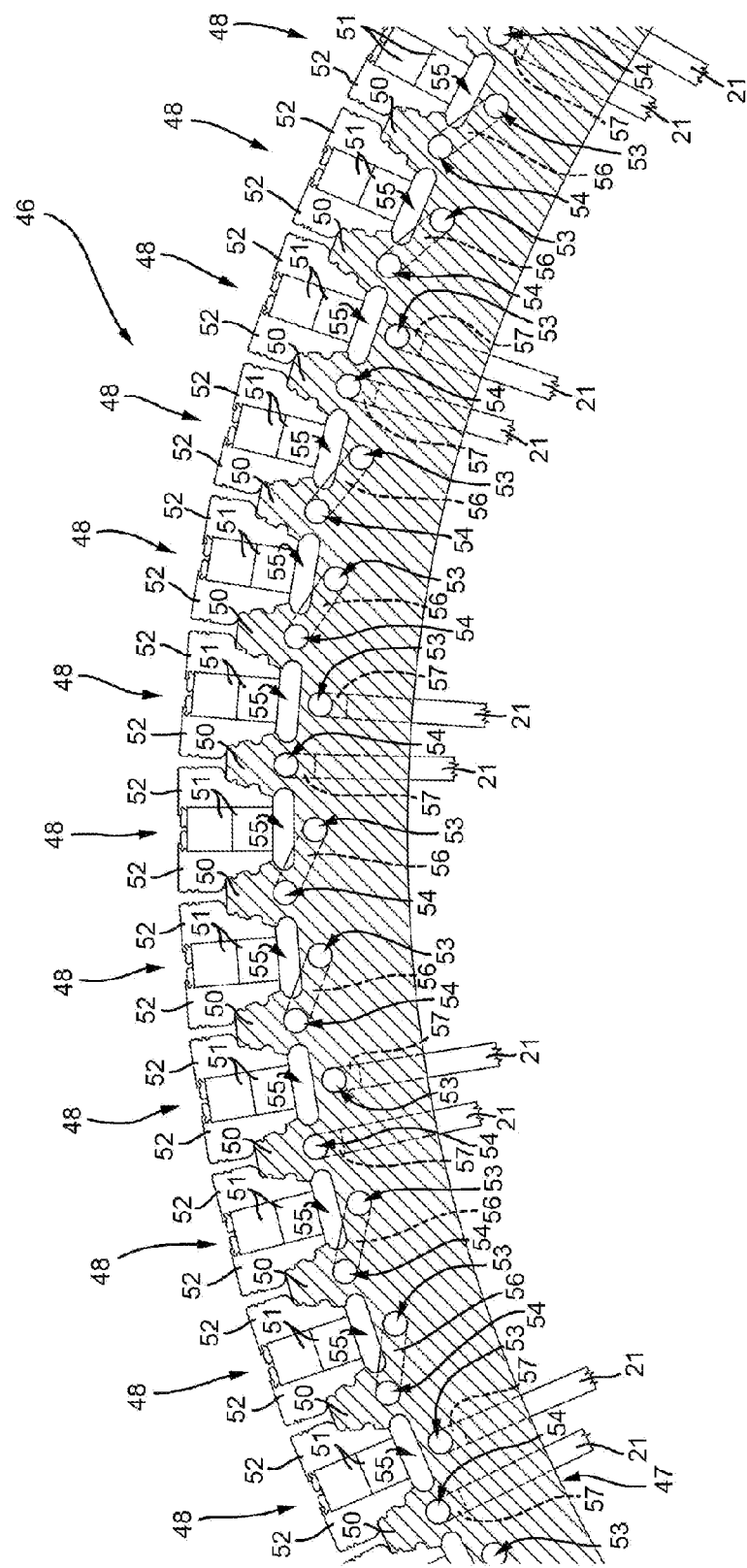
FIG. 7 shows a partly sectioned, schematic side view, with parts removed for clarity, of a rotor in accordance with an alternative embodiment of the present disclosure.

Number 46 in FIG. 7 indicates a rotor of a tubular rotary electric machine for a direct-drive wind turbine.

Rotor 46 comprises a tubular structure 47; and a plurality of active segments 48 arranged along tubular structure 47. Tubular structure 47 has a cylindrical body 49; and a plurality of ribs 50 defining axial seats for active segments 48. And each active segment 48 comprises a group of permanent magnets 51 gripped between two magnetic guides 52.

Tubular structure 47 (i.e., ribs 50 and cylindrical body 49) is, in certain embodiments, cast in one piece, and the parts of tubular structure requiring greater dimensional accuracy subsequently machined. Tubular structure 47 also comprises axial cooling channels 53 and 54 formed in tubular structure 47 itself; and axial cooling channels 55 bounded by tubular structure 47 and active segments 48. Each cooling channel 55 is bounded by an active segment 48, by two adjacent ribs 50, and by cylindrical body 49.

Cooling channels 53, 54 and 55 form part of air or liquid cooling circuits.

Cooling channels 53 and 54 may be relatively easily used to form rotating circuit portion 17 (FIG. 2), and cooling channels 55 are configured to, in certain embodiments, conduct air.

Cooling channels 53 are formed, in certain embodiments cast or drilled, directly inside cylindrical body 49. Cooling channels 54 are formed the same way inside ribs 50. And cooling channels 53 and 54 may be relatively easily connected to one another by U-shaped fittings 56, and to branches 21 by L-shaped fittings 57.

FIG. 8 shows a variation of the active segments 48 fitted to tubular structure 47, it being understood that the FIG. 8 active segments may also be fitted to tubular structure 12, with the necessary alterations to form a prismatic joint with tubular structure 12. Active segment 48 comprises a cooling channel 58 formed in active segment 48 itself. In the example shown, cooling channel 58 is bounded by two permanent magnets 51, and more specifically by two grooves 59 in two adjacent permanent magnets 51.

FIG. 9 shows a further variation of the active segments 48 fitted to tubular structure 47. Active segment 48 comprises a plurality of cooling channels 60 formed in active segment 48 itself. In the example shown, each cooling channel 60 is bounded by two permanent magnets 51 spaced apart, and by magnetic guides 52.

Clearly, changes may be made to the rotor according to the present disclosure without, however, departing from the scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A wind turbine rotary electric machine rotor comprising:
    a tubular structure extending about an axis of rotation and configured to rotate about the axis of rotation, wherein at least one interior surface of said tubular structure defines at least one cooling channel of a first plurality of cooling channels defined by the tubular structure, said at least one cooling channel extending parallel to the axis of rotation; and
    a plurality of active segments arranged parallel to and about the axis of rotation, wherein the plurality of active segments are supported by the tubular structure.

2. The wind turbine rotary electric machine rotor of claim 1, wherein each cooling channel extends a full axial length of the tubular structure.

3. The wind turbine rotary electric machine rotor of claim 1, wherein the tubular structure includes a cylindrical body which defines a plurality of axial cooling channels of the first plurality of cooling channels.

4. The wind turbine rotary electric machine rotor of claim 3, wherein the cylindrical body includes a plurality of axial ribs configured to support the plurality of active segments, said plurality of axial ribs define a plurality of cooling channels of the first plurality of cooling channels.

5. The wind turbine rotary electric machine rotor of claim 1, wherein the tubular structure includes a plurality of sectors arranged about the axis of rotation, said plurality of sectors define a plurality of cooling channels of the first plurality of cooling channels, said plurality of cooling channels extending inside the plurality of sectors.

6. The wind turbine rotary electric machine rotor of claim 5, wherein each sector is an extruded sector and the first plurality of cooling channels include at least one extruded cooling channel directly inside at least one of the sectors.

7. The wind turbine rotary electric machine rotor of claim 5, wherein each sector is defined by a stack of laminations with a plurality of opening, and at least two of the openings aligned in a direction parallel to the axis of rotation define each cooling channel.

8. The wind turbine rotary electric machine rotor of claim 7, wherein each sector includes a plurality of pipes housed in the cooling channels.

9. The wind turbine rotary electric machine rotor of claim 7, wherein the plurality of pipes adhere to said sector along a plurality of walls that define the cooling channels.

10. The wind turbine rotary electric machine rotor of claim 5, wherein each sector has a plurality of axial ribs configured to support the active segments.

11. The wind turbine rotary electric machine rotor of claim 1, which includes a second plurality of cooling channels extending in an axial direction.

12. The wind turbine rotary electric machine rotor of claim 11, wherein the second plurality of cooling channels are defined by the tubular structure and the active segments.

13. The wind turbine rotary electric machine rotor of claim 12, wherein each cooling channel of the second plurality of cooling channels is lined with a hydroformed pipe configured to secure a respective one of the active segments to the tubular structure.

14. The wind turbine rotary electric machine rotor of claim 11, wherein the second plurality of cooling channels extend axially and are located inside the plurality of active segments.

15. The wind turbine rotary electric machine rotor of claim 1, wherein the rotor is associated with a liquid cooling system including at least one rotating circuit portion extending at least partly inside the cooling channels.

16. A wind turbine comprising:
    a rotary electric machine including:
        a rotor including:
            a tubular structure extending about an axis of rotation and configured to rotate about the axis of rotation, wherein at least one interior surface of said tubular structure defines at least one cooling channel of a first plurality of cooling channels defined by the tubular structure, said at least one cooling channel extending parallel to the axis of rotation, and
            a plurality of active segments arranged parallel to and about the axis of rotation, wherein the plurality of active segments are supported by the tubular structure; and
        a blade assembly connected to the rotary electric machine.

17. The wind turbine of claim 16, wherein the rotor is directly connected to the blade assembly.

18. The wind turbine of claim 16, which includes a liquid cooling system including:
    a rotating circuit portion fitted to the rotor, and
    a stationary circuit portion.

* * * * *